(12) United States Patent
Tanaka et al.

(10) Patent No.: US 10,991,484 B2
(45) Date of Patent: Apr. 27, 2021

(54) MULTI-CONDUCTOR CABLE FOR VEHICLE AND METHOD FOR MANUFACTURING MULTI-CONDUCTOR CABLE FOR VEHICLE

(71) Applicant: SUMITOMO ELECTRIC INDUSTRIES, LTD., Osaka (JP)

(72) Inventors: Shigeyuki Tanaka, Osaka (JP); Yutaka Matsumura, Osaka (JP); Taro Fujita, Osaka (JP); Takaya Kohori, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/976,812

(22) PCT Filed: Dec. 19, 2019

(86) PCT No.: PCT/JP2019/049893
§ 371 (c)(1),
(2) Date: Aug. 31, 2020

(87) PCT Pub. No.: WO2020/166205
PCT Pub. Date: Aug. 20, 2020

(65) Prior Publication Data
US 2020/0402684 A1 Dec. 24, 2020

(30) Foreign Application Priority Data
Feb. 14, 2019 (JP) .............................. JP2019-024857

(51) Int. Cl.
*H01B 7/02* (2006.01)
*H01B 7/36* (2006.01)
(Continued)

(52) U.S. Cl.
CPC ............. *H01B 7/363* (2013.01); *B60R 16/02* (2013.01); *B60T 17/00* (2013.01); *H01B 7/0009* (2013.01);
(Continued)

(58) Field of Classification Search
CPC .......... H01R 7/02; H01R 7/363; H01R 7/009; H01R 7/0225; H01R 13/228; H01R 13/348; H01R 13/24; H01R 3/307
(Continued)

(56) References Cited

U.S. PATENT DOCUMENTS

2001/0047730 A1   12/2001   Otani et al.
2016/0176369 A1*   6/2016   Ito .................. B60R 16/0207
                                                  174/72 A
(Continued)

FOREIGN PATENT DOCUMENTS

JP   H08-269883   10/1996
JP   H09-129038   5/1997
(Continued)

*Primary Examiner* — William H. Mayo, III
(74) *Attorney, Agent, or Firm* — IPUSA, PLLC (57) ABSTRACT

A multi-conductor cable for a vehicle includes core wires respectively having a conductor formed by a plurality of twisted wires, and an insulating layer covering an outer periphery of the conductor, and a sheath layer disposed around the core wires. A marking portion is partially formed on an outer peripheral surface of the sheath layer, and a ratio of an arithmetic average roughness Ra2 of a peripheral region adjacent to the marking portion, with respect to an arithmetic average roughness Ra1 of the marking portion, at the outer peripheral surface, is 0.10 or greater and 0.90 or less.

15 Claims, 3 Drawing Sheets

(51) Int. Cl.
*B60R 16/02* (2006.01)
*B60T 17/00* (2006.01)
*H01B 7/00* (2006.01)
*H01B 13/22* (2006.01)
*H01B 13/34* (2006.01)
*H01B 3/30* (2006.01)
*H01B 13/24* (2006.01)

(52) U.S. Cl.
CPC ......... *H01B 7/0225* (2013.01); *H01B 13/228* (2013.01); *H01B 13/348* (2013.01); *H01B 3/307* (2013.01); *H01B 13/24* (2013.01)

(58) Field of Classification Search
USPC ............ 174/110 R, 113 R, 113 AS, 115, 116
See application file for complete search history.

(56) References Cited

U.S. PATENT DOCUMENTS

2016/0254615 A1\* 9/2016 Sugita ...................... H01R 4/70
439/606
2018/0166184 A1\* 6/2018 Hayakawa ........... H01B 7/0045

FOREIGN PATENT DOCUMENTS

| JP | H11-317117 | 11/1999 |
| JP | 2001-135174 | 5/2001 |
| JP | 2009-104879 | 5/2009 |
| JP | 2016-119245 | 6/2016 |
| JP | 2018-097955 | 6/2018 |

\* cited by examiner

MULTI-CONDUCTOR CABLE FOR VEHICLE AND METHOD FOR MANUFACTURING MULTI-CONDUCTOR CABLE FOR VEHICLE

TECHNICAL FIELD

The present disclosure relates to a multi-conductor cable for vehicle, and method for manufacturing the multi-conductor cable for vehicle.

BACKGROUND ART

An outer peripheral surface of a cable may be provided with markings of information including product specifications, such as length, diameter, or the like, manufacturer, part number, or the like. Generally, this marking is formed by printing using an ink (refer to Japanese Laid-Open Patent Publication No. 2009-104879).

PRIOR ART DOCUMENT

Patent Document

Patent Document 1: Japanese Laid-Open Patent Publication No. 2009-104879

DISCLOSURE OF THE INVENTION

Problems to be Solved by the Invention

Nowadays, multi-conductor cables are used to connect a controller to sensors used in used in an anti-lock brake system (ABS) for vehicle or the like, or to actuators used in an electronic parking brake system or the like.

The multi-conductor cable is bent in a complicated manner due to routing inside the vehicle, driving of the actuators, or the like. Further, the multi-conductor cable may be used in a state where at least a portion thereof is exposed outside the vehicle.

For this reason, when providing the marking on the outer peripheral surface of the multi-conductor cable by printing, the marking may peel off due to partial bending, contact, adhesion of mud-water and organic solvents such as gasoline, or the like.

The present disclosure is conceived based on such circumstances, and one object is to provide a multi-conductor cable for a vehicle having an excellent flexing resistance, and capable of preventing an identifiability of a marking portion from deteriorating due to the bending, the contact, the adhesion of the mud-water and the organic solvents such as gasoline, or the like, and a method for manufacturing the multi-conductor cable for vehicle.

Means for Solving the Problem

A multi-conductor cable for a vehicle according to the present disclosure, conceived to solve the above described problem, includes core wires respectively having a conductor formed by a plurality of twisted wires, and an insulating layer covering an outer periphery of the conductor; and a sheath layer disposed around the core wires,
wherein a marking portion is partially formed on an outer peripheral surface of the sheath layer, and
wherein a ratio of an arithmetic average roughness Ra2 of a peripheral region adjacent to the marking portion, with respect to an arithmetic average roughness Ra1 of the marking portion, at the outer peripheral surface, is 0.10 or greater and 0.90 or less.

In addition, a method for manufacturing a multi-conductor cable for a vehicle, includes
core wires respectively having a conductor formed by a plurality of twisted wires, and an insulating layer covering an outer periphery of the conductor, and
a sheath layer disposed around the core wires, conceived to solve the above described problem, includes
a process of forming a marking portion by partially smoothing or roughening an outer peripheral surface of the sheath layer; and
a process of controlling a ratio of an arithmetic average roughness Ra2 of a peripheral region adjacent to the marking portion, with respect to an arithmetic average roughness Ra1 of the marking portion, to 0.10 or greater and 0.90 or less.

Effects of the Invention

The multi-conductor cable for a vehicle according to the present disclosure has an excellent flexing resistance, and is capable of preventing the identifiability of the marking portion from deteriorating due to the bending, the contact, the adhesion of the mud-water and the organic solvents such as gasoline, or the like. Further, the method for manufacturing the multi-conductor cable for the vehicle according to the present disclosure can manufacture a multi-conductor cable for the vehicle having an excellent flexing resistance, and capable of preventing the identifiability of the marking portion from deteriorating due to the bending, the contact, the adhesion of the mud-water and the organic solvents such as gasoline, or the like.

MODE OF CARRYING OUT THE INVENTION

Description of Embodiments of the Present Disclosure

First, embodiments of the present disclosure will be described in the following.

A multi-conductor cable for a vehicle according to the present disclosure, includes core wires respectively having a conductor formed by a plurality of twisted wires, and an insulating layer covering an outer periphery of the conductor; and a sheath layer disposed around the core wires, wherein a marking portion is partially formed on an outer peripheral surface of the sheath layer, and wherein a ratio of an arithmetic average roughness Ra2 of a peripheral region adjacent to the marking portion, with respect to an arithmetic average roughness Ra1 of the marking portion, at the outer peripheral surface, is 0.10 or greater and 0.90 or less.

Since the arithmetic average roughness Ra of the marking portion of the multi-conductor cable for the vehicle differs from that with respect to the region adjacent to the marking portion, it is possible to prevent the marking portion from peeling off due to bending, contact, adhesion of mud-water and organic solvents such as gasoline, or the like, thereby preventing the identifiability of the marking portion from deteriorating. In addition, in the multi-conductor cable for the vehicle, the arithmetic average roughness Ra1 of the marking portion and the arithmetic average roughness Ra2 of the peripheral region adjacent to the marking portion differ, and the ratio of the arithmetic average roughness Ra2 of the peripheral region with to the arithmetic average roughness Ra1 of the marking portion is 0.10 or greater and 0.90 or less, and thus, the identifiability of the marking portion can be secured, and an excellent flexing resistance can be obtained.

An average surface of the marking portion may be substantially lower with respect to an average surface of the peripheral region. The term "lower" is a concept using a center axis of the cable as a reference. Accordingly, even when the marking portion is substantially not concave with respect to the region adjacent to the marking portion, the identifiability of the marking portion can be secured by controlling the arithmetic average roughness Ra of the marking portion and the region adjacent to the marking portion as described above. In addition, since the marking portion is substantially not concave with respect to the region adjacent to the marking portion, it is possible to prevent a step from being formed at a boundary between the marking portion and the region adjacent to the marking portion, and consequently, it is possible to prevent cracks from being generated in the multi-conductor cable for the vehicle due to the step.

The vehicle multi-conductor cable for the vehicle may be connected to at least one of an anti-lock brake system and an electric parking brake system of the vehicle. The multi-conductor cable for the vehicle is suited for connection to the ABS and/or the electric parking brake of the vehicle, because the multi-conductor cable for the vehicle has a sufficient durability even in a state bent in a complicated manner, the identifiability of the marking portion can be prevented from deteriorating even in a state exposed outside the vehicle.

A method for manufacturing a multi-conductor cable for a vehicle, including core wires respectively having a conductor formed by a plurality of twisted wires, and an insulating layer covering an outer periphery of the conductor, and a sheath layer disposed around the core wires, according to the present disclosure, includes a process of forming a marking portion by partially smoothing or roughening an outer peripheral surface of the sheath layer; and a process of controlling a ratio of an arithmetic average roughness Ra2 of a peripheral region adjacent to the marking portion, with respect to an arithmetic average roughness Ra1 of the marking portion, to 0.10 or greater and 0.90 or less.

In the method for manufacturing the multi-conductor cable for the vehicle, the above described process of forming forms the marking portion by partially smoothing or roughening the outer peripheral surface of the sheath layer, and thus, it is possible to manufacture a multi-conductor cable for the vehicle that prevents the marking portion from peeling off due to bending, contact, adhesion of mud-water and organic solvents such as gasoline, or the like, and prevents the identifiability of the marking portion from deteriorating. Further, in the method for manufacturing the multi-conductor cable for the vehicle, the process of forming controls the ratio of the arithmetic average roughness Ra of one of the marking portion and the region adjacent to the marking portion, at the outer peripheral surface, with respect to the arithmetic average roughness Ra of the other, to fall within the above described range, and for this reason, it is possible to manufacture a multi-conductor cable for vehicle that can secure the identifiability of the making portion while exhibiting an excellent flexing resistance.

The process of forming may perform a laser beam machining on the outer peripheral surface of the sheath layer. By performing the laser beam machining on the outer peripheral surface of the sheath layer in the above described process of forming, it become easy to control the arithmetic average roughness Ra of the marking portion to fall within a desired range.

In the present disclosure, the term "marking portion" refers to an region on the outer peripheral surface of the sheath layer indicating characters, numerals, and other symbols or marks. The term "arithmetic average roughness Ra" refers to the value measured at an evaluation length of 1000 μm in conformance with JIS-B0601:2001.

Details of Embodiments of the Present Disclosure

Hereinafter, a multi-conductor cable for a vehicle, and a method for manufacturing the multi-conductor cable for vehicle according to each embodiment of the present disclosure will be described, with reference to the drawings.

First Embodiment

<Multi-Conductor Cable for Vehicle>

Figure 1:
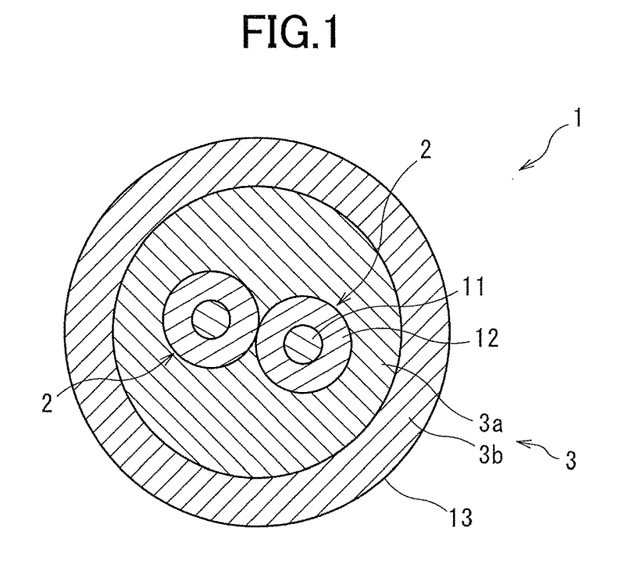
FIG. 1 is a schematic cross sectional view illustrating a multi-conductor cable for a vehicle according to one embodiment of the present disclosure.
Figure 2:
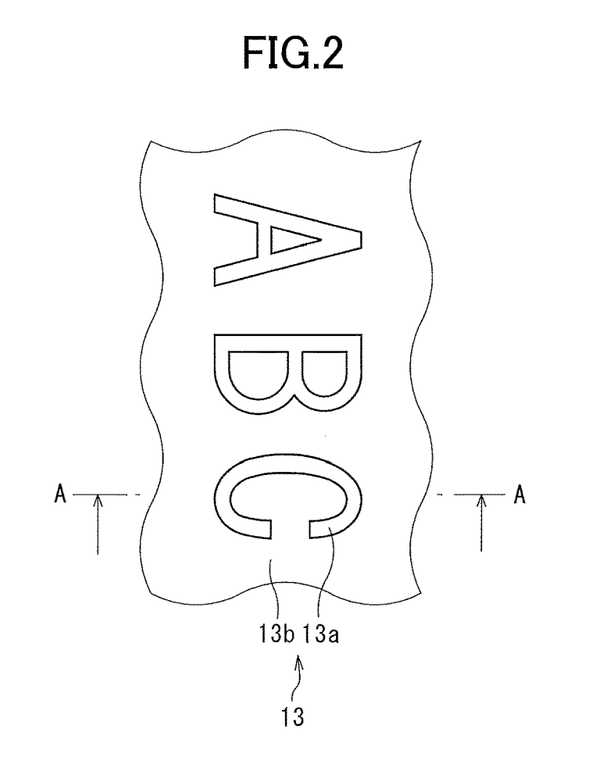
FIG. 2 is a schematic enlarged partial view illustrating an outer peripheral surface of a sheath layer of the multi-conductor cable for the vehicle illustrated in FIG. 1.
Figure 3:
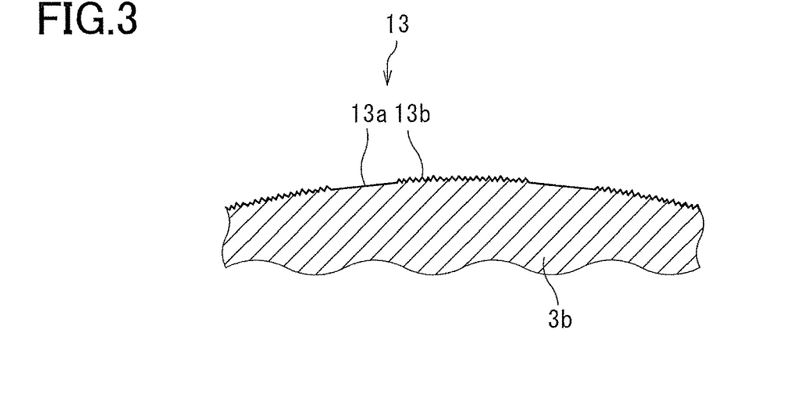
FIG. 3 is a schematic cross sectional view of the multi-conductor cable for the vehicle along a line A-A in FIG. 2.

A multi-conductor cable 1, for vehicle, illustrated in FIG. 1, includes core wires 2 respectively having a conductor 11 formed by a plurality of twisted wires, and an insulating layer 12 covering an outer periphery of the conductor 11, and a sheath layer 3 disposed around the core wires 2. As illustrated in FIG. 2 and FIG. 3, the vehicle multi-conductor cable 1 includes a marking portion 13a provided partially on an outer peripheral surface of the sheath layer 3. The marking portion 13a is formed by partially smoothing or roughening the outer peripheral surface of the sheath layer 3. The vehicle multi-conductor cable 1 is preferably connected to a vehicle ABS or an electric parking brake (EPB) (not illustrated). The vehicle multi-conductor cable 1 may suitably be connected to an ABS or an electronic parking brake (EPB) (not illustrated) of the vehicle. The vehicle multi-conductor cable 1 may suitably used as a cable for transmitting electrical signals to a motor that drives a brake caliper of the ABS or the electric parking brake. Because the ABS and the electric parking brake are exposed from the vehicle and exposed to outside air, the ABS and the electric parking brake are used under a severe environment in which adhesion of the mud-water and organic solvents such as gasoline, and collision of sand and pebbles occur, in addition to being subjected to bends and vibration. Even under such an environment, the vehicle multi-conductor cable 1 can prevent the identifiability of the marking portion 13*a* from deteriorating.

An average outside diameter of the vehicle multi-conductor cable 1 is appropriately designed according to the application, and a lower limit thereof is preferably 3 mm, and more preferably 4 mm. On the other hand, an upper limit of the average outside diameter of the vehicle multi-conductor cable 1 is preferably 16 mm, more preferably 14 mm, still more preferably 12 mm, and particularly preferably 10 mm.

(Sheath Layer)

The sheath layer 3 includes an inner sheath layer 3*a* laminated on the outer periphery of the core wires 2, and an outer sheath layer 3*b* laminated on an outer peripheral surface of the inner sheath layer 3*a*. The sheath layer 3 has a two-layer structure formed by the inner sheath layer 3*a* and the outer sheath layer 3*b*. An outer peripheral surface of the outer sheath layer 3*b* forms the outer peripheral surface 13 of the sheath layer 3, and thus an outer peripheral surface of the vehicle multi-conductor cable 1.

As described above, the sheath layer 3 includes the marking portion 13*a* provided partially on the outer peripheral surface thereof. An arithmetic average roughness Ra of a region (hereinafter also referred to as an "adjacent region") adjacent to the marking portion 13*a* on the outer peripheral surface 13 of the sheath layer 3, and an arithmetic average roughness Ra of the marking portion 13*a*, differ. The marking portion 13*a* is a smooth portion formed by partial smoothing of the outer peripheral surface 13 of the sheath layer 3, or a rough portion formed by partial roughening of the outer peripheral surface 13 of the sheath layer 3. As illustrated in FIG. 2 and FIG. 3, the sheath layer 3 includes the marking portion 13*a* formed by partial smoothing or roughening of the outer peripheral surface 13 thereof, and other regions (untreated regions) that are not surface-treated, and the untreated regions form the adjacent regions 13*b*. The marking portion 13*a* may be formed by performing a laser beam machining, a polishing process, or the like, for example, with respect to the outer peripheral surface of the sheath layer 3.

The lower limit of the ratio of the arithmetic average roughness Ra of one (having the larger arithmetic average roughness Ra) of the adjacent region (adjacent region 13*b*) adjacent to the marking portion 13*a*, and the marking portion 13, at the outer peripheral surface 13 of the sheath layer 3, with respect to the arithmetic average roughness Ra of the other (having the smaller of the arithmetic average roughness Ra), is 0.10, preferably 0.15, and more preferably 0.20. On the other hand, the upper limit of the above described ratio is 0.90, preferably 0.85, and more preferably 0.80. Furthermore, from the viewpoint of simultaneously achieving both the flexing resistance of the vehicle multi-conductor cable 1 and the identifiability of the marking portion 13*a*, the above described ratio is 0.10 or greater and 0.90 or less, preferably 0.15 or greater and 0.85 or less, and more preferably 0.20 or greater and 0.80 or less. The above described ratio is controlled so that, even when vehicle multi-conductor cable 1 is bent in a complicated manner, the identifiability of the marking portion 13*a* can be sufficiently secured, and a sufficient durability can be maintained. From this viewpoint, when the above described ratio is less than the lower limit, it may no longer become possible to easily form the marking portion 13*a*, or a load may easily be applied to the boundary between the marking portion 13*a* and the adjacent region 13*b* due to a rapid change in the arithmetic average roughness Ra, thereby generating cracks at the boundary. On the other hand, when the above described ratio exceeds the upper limit, the identifiability of the marking portion 13*a* may become insufficient. The above described ratio may be adjusted by controlling the laser beam machining conditions, for example.

The marking portion 13*a* is preferably formed by partially smoothing the untreated region. By forming the marking portion 13*a* by partially smoothing the outer peripheral surface 13 of the sheath layer 3, the vehicle multi-conductor cable 1 can easily secure the identifiability of the marking portion 13*a*. Further, according to this configuration, it is possible to more positively prevent cracks or the like of the sheath layer 3 caused by the formation of the unevenness on the surface of the marking portion 13*a*. Particularly when the vehicle multi-conductor cable 1 is connected to the ABS and/or the electric parking brake of the vehicle, the effect of preventing the cracks caused by the above described smoothing is large, because the vehicle multi-conductor cable 1 often bent in the complicated manner.

The arithmetic average roughness Ra of the marking portion 13*a* can be set in relation to the arithmetic average roughness Ra of the adjacent region 13*b*, and the lower limit thereof is preferably 5.0 µm, and more preferably 10.0 µm, for example. On the other hand, the upper limit of the arithmetic average roughness Ra of the marking portion 13*a* is preferably 50.0 µm, and more preferably 40.0 µm, for example.

The marking portion 13*a* is preferably substantially not concave with respect to the adjacent region 13*b*. When the marking portion 13*a* is substantially not concave with respect to the adjacent region 13*b*, the marking portion 13*a* is formed by selectively removing or melting fine convex portions on the surface of the adjacent region 13*b*, as illustrated in FIG. 3, for example. Even when the marking portion 13*a* is substantially not concave with respect to the adjacent region 13*b*, the vehicle multi-conductor cable 1 can secure the identifiability of the marking portion 13*a*, by controlling the ratio of the arithmetic average roughnesses Ra of the adjacent region 13*b* and the marking portion 13*a* to fall within the above described range. In addition, since the marking portion 13*a* is substantially not concave with respect to the adjacent region 13*b*, the vehicle multi-conductor cable 1 can prevent a step from being formed at the boundary between the marking portion 13*a* and the adjacent region 13*b*, thereby preventing the cracks from being generated by this step.

As long as the marking portion 13*a* is identifiable and distinguishable from the adjacent region 13*b*, the information displayed by the marking portion 13*a* itself is not particularly limited. However, in the vehicle multi-conductor cable 1, the marking portion 13*a* preferably includes a character string of characters, numerals, or the like. Generally, when the marking portion includes a character string, a boundary line between the marking portion and the adjacent region may be extend in multiple directions in a complicated manner, and cracks may easily be generated from the boundary line between the marking portion and the adjacent region, as an originating point. However, in the vehicle multi-conductor cable 1, the ratio of the arithmetic average roughnesses Ra of the adjacent region 13*b* and the marking portion 13*a* is controlled to fall within the above described range, so that even when the vehicle multi-conductor cable 1 is bent in the complicated manner, it is possible to sufficiently prevent the cracks from originating from the boundary line between the marking portion 13*a* and the adjacent region 13*b*.

The surface layer (surface layer of the outer sheath layer 3b) of the sheath layer 3 forming the marking portion 13a is preferably not modified. The strength of the vehicle multi-conductor cable 1 can be increased by not modifying the surface layer of the sheath layer 3. The term "modifying" refers to a change in a composition of a region with respect to other regions.

A direction in which the marking portion 13a is arranged is not particularly limited. The marking portion 13a may be formed along the axial direction of the vehicle multi-conductor cable 1, or may be formed along a circumferential direction of the vehicle multi-conductor cable 1.

A main component of the inner sheath layer 3a is not limited to a particular synthetic resin, as long as the synthetic resin is flexible, and examples of the synthetic resin include polyolefins, such as polyethylenes, ethylene-vinyl acetate (EVA) copolymers, polyurethane elastomers, polyester elastomers, or the like. A mixture of two or more kinds of such synthetic resins may be used. The term "main component" refers to a component having the highest content in terms of mass, and is a component having a content that is 50 mass % or higher, for example.

A lower limit of a minimum thickness of the inner sheath layer 3a (minimum distance between the core wire 2 and the outer periphery of the inner sheath layer 3a) is preferably 0.2 mm, and more preferably 0.3 mm. On the other hand, an upper limit of the minimum thickness of the inner sheath layer 3a is preferably 0.9 mm, and more preferably 0.8 mm. In addition, a lower limit of the average outside diameter of the inner sheath layer 3a is preferably 2.0 mm, and more preferably 3.0 mm. On the other hand, an upper limit of the average outside diameter of the inner sheath layer 3a is preferably 10.0 mm, and more preferably 9.3 mm.

A main component of the outer sheath layer 3b is not limited to a particular synthetic resin, as long as the synthetic resin exhibits excellent flame resistance and excellent abrasion resistance, and polyurethane or the like may be used therefor, for example.

An average thickness of the outer sheath layer 3b is preferably 0.2 mm or greater and 0.7 mm or less. The term "average thickness" refers to an average value of the thicknesses measured at 10 arbitrary points. Hereinafter, the "average thickness" is similarly defined for other members or the like.

The resin components of the inner sheath layer 3a and the outer sheath layer 3b are preferably crosslinked, respectively. Methods of crosslinking the resin components include a method that irradiates ionizing radiation, a method that uses a thermal crosslinking agent such as organic peroxides or the like, a method that adds a silane coupling agent to cause a silane graft reaction, or the like.

The inner sheath layer 3a and the outer sheath layer 3b may include additives such as flame retardants, flame retardar-assistants, antioxidants, lubricants, colorants, reflection-imparting agents, masking agents, process stabilizers, plasticizers, or the like, as appropriate.

A tape member, such as paper or the like, may be wound between the sheath layer 3 and the core wire 2, as a winding reduction member.

(Core Wire)

The vehicle multi-conductor cable 1 includes two core wires 2 twisted together. The cross sectional shape of the core wire 2 is not particularly limited, and may be circular, for example. Average outside diameters of the two core wires 2 are approximately the same. When the cross sectional shape of the core wire 2 is circular, the average outside diameters may be 1 mm or greater and 10 mm or less, for example, depending on the application. The average outside diameter of the cross section of the core wire 2 is not particularly limited, and for example, an average value of the outside diameters measured at three arbitrary points on the core wire 2 using a caliper, may be regarded as the average outside diameter.

<Conductor>

The conductor 11 is formed by twisting a plurality of wires at a constant pitch. The wires are not particularly limited, and examples of the wires include copper wires, copper alloy wires, aluminum wires, aluminum alloy wires, or the like. Further, the conductor 11 may be formed by twisting a plurality of stranded wires respectively formed by twisting a plurality of wires together. The stranded wires that are twisted preferably have the same number of wires.

A lower limit of an average diameter of the wires is preferably 40 µm, more preferably 50 µm, and still more preferably 60 µm. On the other hand, an upper limit of the average diameter of the wires is preferably 100 µm, and more preferably 90 µm. When the average diameter of the wires is smaller than the lower limit or exceeds the upper limit, the effect of improving the flexing resistance of the vehicle multi-conductor cable 1 may not be sufficiently exhibited. A method of measuring the average diameter of the wires is not particularly limited, and for example, an average value of the diameters measured at three arbitrary points on the wire using a micrometer having both ends that are cylindrical, may be used as the average diameter of the wires.

The number of wires may be appropriately designed according to the application of the vehicle multi-conductor cable 1, the diameter of the wires, or the like, but a lower limit of the number of wires is preferably 7, and more preferably 19. On the other hand, an upper limit of the number of wires is preferably 2450, and more preferably 2000. Examples of stranded wires include 7 stranded wires respectively including 28 twisted wires and twisted together to include 196 wires in total, 7 stranded wires respectively including 42 twisted wire and twisted together to include 294 wires in total, 19 stranded wires respectively including 20 twisted wires and twisted together to include 380 wires in total, 7 stranded wires respectively including 32 twisted wires and twisted together to include 224 wires in total and further twisting 7 such strands together to include 1568 wires in total, 7 stranded wires respectively including 50 twisted wires and twisted together to include 350 wires in total and further twisting 7 such strands together to include 2450 wires in total, or the like.

A lower limit of an average area (including gaps between the wires) of the cross section of the conductor 11 is preferably 0.18 mm$^2$, and more preferably 0.25 mm$^2$. On the other hand, an upper limit of the average area of the cross section of conductor 11 is preferably 5.0 mm$^2$, and more preferably 4.5 mm$^2$. By setting the average area of the cross section of the conductor 11 to fall within the above described range, the cable becomes suitable for use as a vehicle multi-conductor cable. A method of computing the average area of the cross section of the above described conductor is not particularly limited, and for example, an average value of the outside diameters measured at three arbitrary points on the conductor using a caliper while paying attention so as not to crush the twisted structure of the conductor, may be regarded as the average outside diameter, and an area computed from this average outside diameter may be regarded as the average area.

[Insulating Layer]

The insulating layer 12 is formed by a composition including a synthetic resin as the main component thereof, and is laminated on the outer periphery of the conductor 11 so as to cover the conductor 11. An average thickness of the insulating layer 12 is not particularly limited, and may be 0.1 mm or greater and 5 mm or less, for example.

The main component of the insulating layer 12 is a polyethylene-based resin, for example. Examples of the polyethylene-based resin include high density polyethylenes, low density polyethylenes, straight-chain low density polyethylenes, ethylene-α olefin copolymers, or the like. Examples of the ethylene-α olefin copolymers include ethylene-propylene copolymers, EVAs, ethylene-ethyl acrylate (EEA) copolymers, ethylene-methyl acrylate (EMA) copolymers, ethylene-butyl acrylate (EBA) copolymers, or the like. Among the polyethylene-based resins, the low density polyethylenes, the straight-chain low density polyethylenes, the EVAs, and the EEAs are preferable.

The insulating layer 12 may include additives such as flame retardants, flame retardar-assistants, antioxidants, lubricants, colorants, reflection-imparting agents, masking agents, process stabilizers, plasticizers, or the like, as appropriate. Further, the insulating layer 12 may include a resin other than the polyethylene-based resin.

The resin component of the insulating layer 12 is preferably crosslinked. Methods of crosslinking the resin component include a method that irradiates ionizing radiation, a method that uses a thermal crosslinking agent such as organic peroxides or the like, a method that adds a silane coupling agent to cause a silane graft reaction, or the like.

<Method for Manufacturing Vehicle Multi-Conductor Cable>

Next, an example of a method for manufacturing the vehicle multi-conductor cable 1 will be described. The method for manufacturing the vehicle multi-conductor cable manufactures the vehicle multi-conductor cable including the core wires 2 respectively having the conductor 11 formed by the plurality of twisted wires, and the insulating layer 12 covering the outer periphery of the conductor 11, and the sheath layer 3 disposed around the core wires 2, and the method for manufacturing the vehicle multi-conductor cable includes a process of forming the marking portion 13 by partially smoothing or roughening the outer peripheral surface of the sheath layer 3. The method for manufacturing the vehicle multi-conductor cable includes a process of twisting the plurality of core wires 2 together, and a process of covering the outer side of the plurality of twisted core wires 2 by the sheath layer 3.

Figure 4:
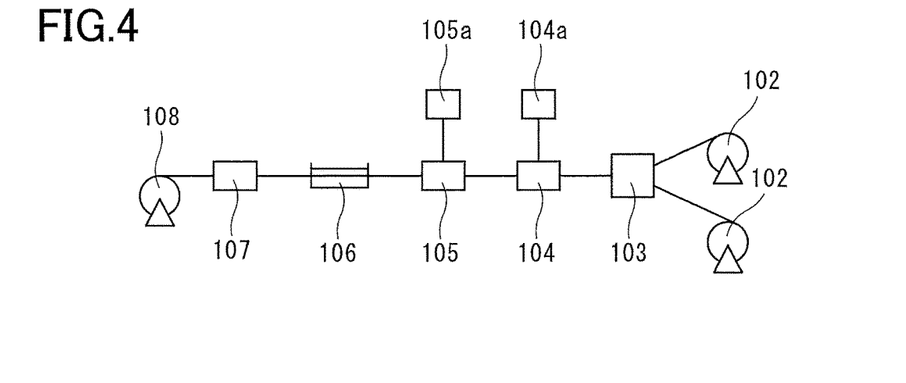
FIG. 4 is a schematic diagram illustrating an apparatus for manufacturing the multi-conductor cable for the vehicle illustrated in FIG. 1.

The method for manufacturing the vehicle multi-conductor cable may be performed using a manufacturing apparatus illustrated in FIG. 4. This manufacturing apparatus primarily includes a plurality of supply reels 102, a twisting section 103, an inner sheath layer covering section 104, an outer sheath layer covering section 105, a cooling section 106, a marking portion forming section 107, and a take-up reel 108. The plurality of supply reels 102, the twisting section 103, the inner sheath layer covering section 104, the outer sheath layer covering section 105, the cooling section 106, the marking portion forming section 107, and the take-up reel 108 are provided in this order from an upstream side to a downstream side along a transport direction.

(Twisting Process)

In the above described twisting process, the core wires 2 wound around the plurality of supply reels 102 are respectively supplied to the twisting section 103, and the plurality of core wires 2 are twisted by the twisting section 103.

(Covering Process)

In the above described covering process, the inner sheath layer covering section 104 extrudes a resin composition for forming the inner sheath layer, stored in a reservoir 104a, onto the outer side the core wires 2 after the twisting by the twisting section 103. Hence, the inner sheath layer 3a covers the outer side of the core wires 2.

After covering by the inner sheath layer 3a, the outer sheath layer covering section 105 extrudes a resin composition for forming an outer sheath layer, stored in a reservoir 105a, onto the outer periphery of the inner sheath layer 3a. Hence, the outer sheath layer 3b covers the outer periphery of the inner sheath layer 3a.

After covering by the outer sheath layer 3b, the sheath layer 3 is cured by cooling the core wires 2 by the cooling section 106, and an untreated region is formed on the entire outer peripheral surface of the sheath layer 3.

(Forming Process)

In the above described forming process, the marking portion 13a is formed by the marking portion forming section 107. In the above described forming process, the outer peripheral surface 13 of the sheath layer 3 is partially smoothed or roughened by a laser beam machining, a polishing processing, or the like, for example. The vehicle multi-conductor cable 1 is obtained by forming the marking portion 13a by the above described forming process. In the method for manufacturing the vehicle multi-conductor cable, the multi-conductor cable after the above described forming process is taken up and recovered by the take-up reel 108.

In the above described forming process, the ratio of the arithmetic average roughness Ra of one of the marking portion 13a, and the region (adjacent region 13b) adjacent to the marking portion 13a, with respect to the arithmetic average roughness Ra of the other, at the outer peripheral surface 13 of the sheath layer 3, is controlled to be 0.10 or greater and 0.90 or less.

In the above described forming process, the surface roughness, such as the arithmetic average roughness Ra or the of the marking portion 13a, is controlled. In the above described forming process, the above described ratio and the arithmetic average roughness Ra of the marking portion 13a are preferably controlled to fall within the ranges described above with reference to the vehicle multi-conductor cable 1.

In the above described forming process, the marking portion 13a is preferably formed so that the marking portion 13a is substantially not concave with respect to the adjacent region 13b. In the above described forming process, the surface layer of the sheath layer 3 forming the marking portion 13a is preferably not modified. Further, in the above described forming process, the marking portion 13a is preferably formed so as to include the character string.

In the above described forming process, when the outer peripheral surface of the sheath layer 3 is subjected to the laser beam machining, the marking portion 13a having the desired arithmetic average roughness Ra or the like may be formed by controlling the laser beam machining conditions.

Examples of the laser beam irradiated in the above described forming process include a solid-state laser, such as an yttrium aluminum garnet (YAG) laser, an yttrium vanadate ($YVO_4$) laser, or the like, a gas laser, such as a $CO_2$ laser or the like, and the $CO_2$ laser is preferable.

(Other Processes)

The method for manufacturing the vehicle multi-conductor cable may preferably further include a process of crosslinking the resin component of the sheath layer 3. The crosslinking process may be performed as a part of the above described covering process, or may be performed separately from the above described covering process. In addition, the crosslinking process may be performed before or after covering the core wires 2 with the composition forming the sheath layer 3.

The crosslinking may be performed by irradiating the ionizing radiation, for example. A lower limit of an irradiation dose of the ionizing radiation is preferably 50 kGy, and more preferably 100 kGy. On the other hand, an upper limit of the irradiation dose of the ionizing radiation is preferably 300 kGy, and more preferably 240 kGy. The crosslinking reaction may not progress sufficiently when the irradiation dose is less than the above described lower limit. On the other hand, decomposition of the resin components may occur when the irradiation dose exceeds the above described upper limit.

<Advantages>

Since the vehicle multi-conductor cable 1 is formed by so that the arithmetic average roughness Ra of the marking portion 13a differs from that with respect to the adjacent region 13b, the peeling of the marking portion 13a caused by the bending, the contact, the adhesion of the mud-water and the organic solvents such as gasoline, or the like, can be prevented, thereby preventing the identifiability of the marking portion 13a from deteriorating. In addition, because the ratio of the arithmetic average roughness Ra of one of the adjacent region 13b and the marking portion 13a, with respect to the arithmetic average roughness Ra of the other, falls within the above described range, the vehicle multi-conductor cable 1 can secure the identifiability of the marking portion 13a, and exhibit an excellent flexing resistance.

The vehicle multi-conductor cable 1 has a sufficient durability even in the state bent in the complicated manner, and can prevent the identifiability of the marking portion 13a from deteriorating even when exposed outside the vehicle, thereby suiting the cable for use in making connections to the ABS or the electric parking brake of the vehicle.

In the method for manufacturing the vehicle multi-conductor cable, the above described forming process forms the marking portion 13a by partially smoothing or roughening the outer peripheral surface 13 of the sheath layer 3, thus preventing the marking portion 13a from peeling off due to the bending, the contact, the adhesion of the mud-water and the organic solvents such as gasoline, or the like, and can manufacture the vehicle multi-conductor cable 1 that can prevent the identifiability of the marking portion 13a from deteriorating. Further, in the method for manufacturing the vehicle multi-conductor cable, since the above described forming process controls the ratio of the arithmetic average roughness Ra of one of the adjacent region 13b and the marking portion 13a, with respect to the arithmetic average roughness Ra of the other, to fall within the above described range, it is possible to manufacture the vehicle multi-conductor cable having an excellent flexing resistance, while securing the identifiability of the marking portion 13a.

In the method for manufacturing the vehicle multi-conductor cable, the surface roughness, such as the arithmetic average roughness Ra or the like, of the marking portion 13a, can easily be controlled to fall within a desired range, by performing the laser beam machining on the outer peripheral surface 13 of the sheath layer 3 in the above described forming process.

Second Embodiment

<Vehicle Multi-Conductor Cable>

Figure 5:
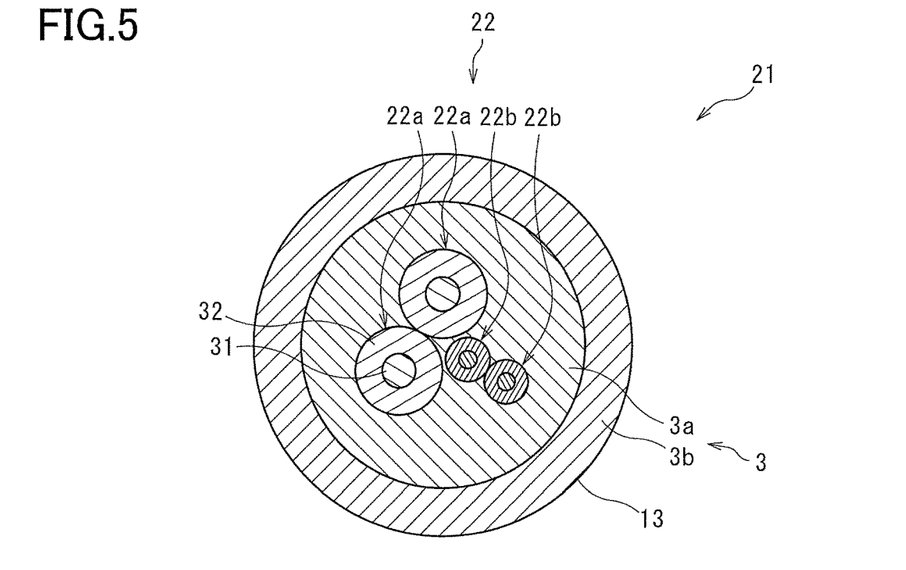
FIG. 5 is a schematic cross sectional view illustrating the multi-conductor cable for the vehicle according to an embodiment different from the multi-conductor cable for the vehicle illustrated FIG. 1.

A vehicle multi-conductor cable 21 illustrated in FIG. 5 includes core wires 22 respectively having a conductor 31 formed by a plurality of twisted wires, and an insulating layer 32 covering an outer periphery of the conductor 31, and a sheath layer 3 disposed around the core wires 22. The vehicle multi-conductor cable 21 includes a marking portion provided partially on the outer peripheral surface of the sheath layer 3. The marking portion is formed by partially smoothing or roughening the outer peripheral surface 13 of the sheath layer 3. The vehicle multi-conductor cable 21 has a plurality of core wires 22 having different diameters, unlike the vehicle multi-conductor cable 1 illustrated in FIG. 1. In the vehicle multi-conductor cable 21, the arithmetic average roughness Ra of the region (above described adjacent region) adjacent to the marking portion, and the arithmetic average roughness Ra of the marking portion, at the outer peripheral surface 13 of the sheath layer 3, are different. The ratio of the arithmetic average roughness Ra of one (having the larger arithmetic average roughness Ra) of the adjacent region and the marking portion 13, with respect to the arithmetic average roughness Ra of the other (having the smaller of the arithmetic average roughness Ra), is 0.10 or greater and 0.90 or less. Since the sheath layer 3 according to this embodiment is the same as the sheath layer 3 of the vehicle multi-conductor cable 1 illustrated in FIG. 1, the same reference numeral is used therefor, and the description thereof will be omitted.

The vehicle multi-conductor cable 21 is suitable for use as a signal cable for the electric parking brake, and for use as a signal cable for transmitting electrical signals to control the operation of the ABS of the vehicle. In other words, the vehicle multi-conductor cable 21 may be connected to the ABS and/or the electric parking brake of the vehicle.

The plurality of core wires 22 include two first core wires 22a having the same diameter, and two second core wires 22b having the same diameter which is smaller than the diameter of the first core wires 22a. The two first core wires 22a and the two second core wires 22b are twisted together. More particularly, the two first core wires 22a, and a twisted pair of the two second core wires 22b, are twisted together. When the vehicle multi-conductor cable 21 is used as an electric parking brake and ABS signal cable, the twisted pair of the second core wires 22b transmits the signals for the ABS.

The first core wire 22a may have the same configuration as the core wire 2 illustrated in FIG. 1. In addition, the second core wire 22b may have the same configuration as the core wire 2 illustrated in FIG. 1, except for the different diameters of the conductor 31 and the insulating layer 32.

<Method for Manufacturing Vehicle Multi-Conductor Cable>

The method for manufacturing the vehicle multi-conductor cable 21 illustrated in FIG. 5 includes a process of forming the marking portion by partially smoothing or roughening the outer peripheral surface 13 of the sheath layer 3, similar to the vehicle multi-conductor cable 1 illustrated in FIG. 1. Further, the method for manufacturing the vehicle multi-conductor cable includes a process of twisting the plurality of core wires 22 together, and a process of covering the outer side of the plurality of twisted core wires 22 by the sheath layer 3.

<Advantages>

Similar to the vehicle multi-conductor cable 1 illustrated in FIG. 1, the vehicle multi-conductor cable 21 can prevent the marking portion from peeling off due to the bending, the contact, or the like, thereby preventing the identifiability of the marking portion from deteriorating. In addition, similar to the vehicle multi-conductor cable 1 illustrated in FIG. 1, the vehicle multi-conductor cable 21 can secure the identifiability of the above described marking portion, and has an excellent flexing resistance.

The method for manufacturing the vehicle multi-conductor cable can easily and positively manufacture the vehicle multi-conductor cable 21.

Other Embodiments

The embodiments disclosed herein should be considered to be illustrative in all respects and not restrictive. The scope of the present invention is not limited to the configurations of the above described embodiments, and is intended to include all modifications within the meaning and scope of the as set forth in the claims and equivalents thereof.

The vehicle multi-conductor cable may employ a configuration in which the marking portion is concave with respect to the region adjacent to the marking portion, in a case where cracks are not generated by bending, for example.

The sheath layer may be a single layer, or may have a multi-layer structure including three or more layers.

The number of the core wires is not particularly limited. Further, the vehicle multi-conductor cable may include wires other than the core wires described above.

The core wire may have a primer layer that is directly laminated on the conductor. Crosslinking resins, such as ethylene or the like, not containing a metal hydroxide, may preferably be used for the primer layer. By providing such a primer layer, it is possible to prevent peel resistances of the insulating layer and the conductor from deteriorating over time.

Exemplary Implementations

Although the invention will be described in more detail in conjunction with the following exemplary implementations, the present invention is not limited to these exemplary implementations.

[No. 1]

The first core wire is obtained by forming an insulating layer having an outside diameter of 3 mm, by extruding an insulating layer forming composition consisting including polyethylene as a main component thereof, on an outer periphery of a conductor (average diameter of 2.4 mm) that is formed by 7 stranded wires twisted together and respectively including 72 twisted annealed copper wires having an average diameter of 80 μm. In addition, the second core wire is obtained by forming an insulating layer having an outside diameter of 1.4 mm, by extruding an insulating layer forming composition including polyethylene as a main component thereof, on an outer periphery of a conductor (average diameter of 0.72 mm) that is formed by 60 twisted copper alloy wires having an average diameter of 80 μm. Next, after twisting two identical first core wires and the second core wire together (twisting process), the sheath layer is extruded around the core wires to cover these core wires (covering process). Further, a marking portion is formed, as a character indication, by irradiating a laser beam on an outer peripheral surface of the sheath layer (forming process), to thereby manufacture the vehicle multi-conductor cable of No. 1. An inner sheath layer including crosslinked polyolefin as a main component thereof, and having a minimum thickness of 0.45 mm and an average outside diameter of 7.4 mm, and an outer sheath layer including flame retardant crosslinked polyurethane as a main component thereof, and having an average thickness of 0.5 mm and an average outside diameter of 8.4 mm, are formed as the above described sheath layer. The resin component of the sheath layer is crosslinked by electron beam irradiation at 180 kGy.

[No. 2 to No. 8]

The vehicle multi-conductor cables of No. 2 to No. 8 are manufactured, similar to No. 1, except for the laser beam irradiation conditions of the above described forming process that are changed.

<Arithmetic Average Roughness>

The arithmetic average roughnesses Ra of the marking portion, and the region (adjacent region) adjacent to the marking portion are measured in conformance with JISB0601:2001 at an evaluation length (l) of 1000 μm, and a cutoff value (λc) of 1.0 μm, with respect to the vehicle multi-conductor cables of No. 1 to No. 8. The results of the measurement are illustrated in Table 1.

<Existence of Cavity>

Measurements are made with respect to the vehicle multi-conductor cables of No. 1 to No. 8, to determine whether or not the marking portion is substantially concave with respect to the adjacent region. More particularly, a scanning electron microscope (SEM) is used to observe a cross sectional photograph that includes a boundary between the marking portion and the adjacent region, and an average value of height differences between the marking portion and the adjacent region at five respective arbitrary points is obtained, to measure the existence or non-existence of a cavity. The results of the measurement are illustrated in Table 1. Further, in Table 1, when the measured value is 10 μm or less, the non-existence of the cavity is determined, as "A", and when the measured value exceeds 10 μm, the existence of the cavity is determined, as "B".

<Visibility of Marking Portion>

The visibility of the marking portion is determined based on the following criteria, with respect to the vehicle multi-conductor cables of No. 1 to No. 8. Table 1 illustrates the determination results as follows.

A: The marking portion is visible as text.
B: The marking portion is not visible as text.

<Flexing Test>

Figure 6:
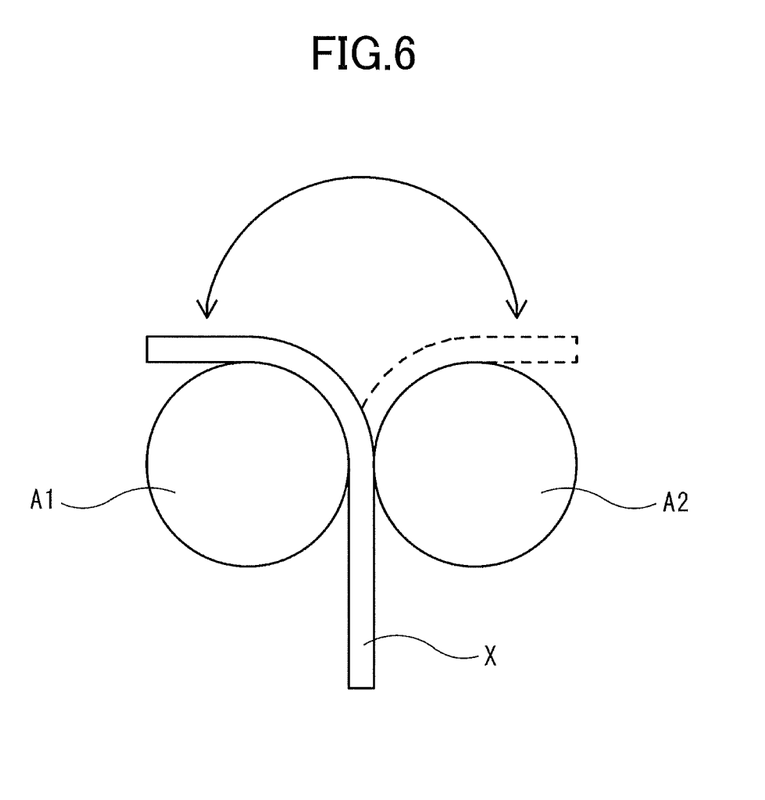
FIG. 6 is a schematic diagram for explaining a flexibility test in one embodiment.

As illustrated in FIG. 6, the vehicle multi-conductor cable X of each of No. 1 to No. 8 are passed in a vertical direction, between two mandrels that have a diameter of 60 mm and are arranged horizontally and parallel to each other, an upper end of the cable X is bent 90 degrees in a horizontal direction to make contact with an upper side of one mandrel A1, and thereafter bent 90 degrees in an opposite direction to make contact with an upper side of the other mandrel A2, and such bending is repeated. For the test conditions include a load of 2 kg applied downward on a lower end of the vehicle multi-conductor cable X, a temperature of −30° C., and a speed of the bends that is 60 times/minute. In this test, the number of bends is measured until a crack is generated in the sheath layer. The results of this measurement are illustrated in Table 1.

TABLE 1

| | ARITHMETIC AVERAGE ROUGHNESS Ra | | RATIO OF SMALL VALUE WITH RESPECT TO LARGE VALUE | EXISTENCE OF CAVITY | | VISIBILITY OF MARKING PORTION | NUMBER OF FLEXING |
|---|---|---|---|---|---|---|---|
| | MARKING PORTION [μm] | ADJACENT REGION [μm] | | HEIGHT DIFFERENCE [μm] | DETERMINATION RESULT | | |
| No. 1 | 20 | 25 | 0.80 | <10 | A | A | 45000 |
| No. 2 | 12 | 25 | 0.48 | <10 | A | A | 39000 |
| No. 3 | 50 | 25 | 0.50 | <10 | A | A | 40000 |
| No. 4 | 24 | 25 | 0.96 | <10 | A | B | 48000 |
| No. 5 | 27 | 25 | 0.93 | <10 | A | B | 48000 |
| No. 6 | 2 | 25 | 0.08 | <10 | A | A | 20000 |
| No. 7 | 290 | 25 | 0.09 | <10 | A | A | 15000 |
| No. 8 | 20 | 25 | 0.80 | 100 | B | A | 8000 |

[Evaluation Results]

As illustrated in Table 1, in the case of No. 4 and No. 5, because the ratio of the arithmetic average roughness Ra of one of the adjacent region and the marking portion with respect to the arithmetic average roughness Ra of the other, exceeds 0.90, the visibility of the marking portion becomes insufficient. On the other hand, in the case of No. 6 and No. 7, because the ratio of the arithmetic average roughness Ra of one of the adjacent region and the marking portion with respect to the arithmetic average roughness Ra of the other, is less than 0.10, the number of flexing becomes small, and the flexing resistance becomes insufficient. In addition, in the case of No. 8, since the marking portion is substantially concave with respect to the adjacent region, the number of flexing becomes small, and the flexing resistance becomes insufficient. On the other hand, in the case of No. 1 to No. 3, excellent results are obtained for both the flexing resistance and the visibility of the marking portion.

DESCRIPTION OF THE REFERENCE NUMERALS 1, 21 Multi-Conductor Cable for Vehicle
2, 22 Core Wire
3 Sheath Layer
3a Inner Sheath Layer
3b Outer Sheath Layer
11, 31 Conductor
12, 32 Insulating layer
13 Outer Peripheral Surface
13a Marking Portion
13b Adjacent Region
22a First Core Wire
22b Second Core Wire
102 Supply Reel
103 Twisting Section
104 Inner Sheath Layer Covering Section
104a and 105a Reservoirs
105 Outer Sheath Layer Covering Section
106 Cooling Section
107 Marking Portion Forming Section
108 Take-up Reel
A1, A2 Mandrel
X Multi-Conductor Cable for Vehicle

The invention claimed is:

1. A multi-conductor cable for a vehicle, comprising:
   core wires respectively having a conductor formed by a plurality of twisted wires, and an insulating layer covering an outer periphery of the conductor; and
   a sheath layer disposed around the core wires,
   wherein a marking portion is partially formed on an outer peripheral surface of the sheath layer, and
   wherein a ratio of an arithmetic average roughness Ra2 of a peripheral region adjacent to the marking portion, with respect to an arithmetic average roughness Ra1 of the marking portion, at the outer peripheral surface, is 0.10 or greater and 0.90 or less.

2. The multi-conductor cable for the vehicle as claimed in claim 1, wherein an average surface of the marking portion is substantially lower with respect to an average surface of the peripheral region.

3. The multi-conductor cable for the vehicle as claimed in claim 2, wherein
   an average outside diameter is 3 mm or greater and 16 mm or less,
   an average area of the conductor in a cross section is 0.18 mm$^2$ or greater and 5.0 mm$^2$ or less,
   an average thickness of the insulating layer is 0.1 mm or greater and 5 mm or less, and
   the insulating layer includes a polyethylene-based resin as a main component thereof.

4. The multi-conductor cable for the vehicle as claimed in claim 3, wherein the polyethylene-based resin is crosslinked in the insulating layer.

5. The multi-conductor cable for the vehicle as claimed in claim 3, wherein
   an average diameter of the wires is 40 μm or greater and 100 μm or less, and
   a number of the wires is 7 or greater and 2450 or less.

6. The multi-conductor cable for the vehicle as claimed in claim 2, wherein
   an average diameter of the wires is 40 μm or greater and 100 μm or less, and
   a number of the wires is 7 or greater and 2450 or less.

7. The multi-conductor cable for the vehicle as claimed in claim 1, which is connected to at least one of an anti-lock brake system and an electric parking brake system of the vehicle.

8. The multi-conductor cable for the vehicle as claimed in claim 1, wherein
   an average outside diameter is 3 mm or greater and 16 mm or less,
   an average area of the conductor in a cross section is 0.18 mm$^2$ or greater and 5.0 mm$^2$ or less,
   an average thickness of the insulating layer is 0.1 mm or greater and 5 mm or less, and
   the insulating layer includes a polyethylene-based resin as a main component thereof.

9. The multi-conductor cable for the vehicle as claimed in claim 8, wherein the polyethylene-based resin is crosslinked in the insulating layer.

10. The multi-conductor cable for the vehicle as claimed in claim 1, wherein
an average diameter of the wires is 40 µm or greater and 100 µm or less, and
a number of the wires is 7 or greater and 2450 or less.

11. A method for manufacturing a multi-conductor cable for a vehicle, including core wires respectively having a conductor formed by a plurality of twisted wires, and an insulating layer covering an outer periphery of the conductor, and a sheath layer disposed around the core wires, the method comprising:
forming a marking portion by partially smoothing or roughening an outer peripheral surface of the sheath layer; and
controlling a ratio of an arithmetic average roughness Ra2 of a peripheral region adjacent to the marking portion, with respect to an arithmetic average roughness Ra1 of the marking portion, to 0.10 or greater and 0.90 or less.

12. The method for manufacturing the multi-conductor cable for the vehicle as claimed in claim 11, wherein the forming performs a laser beam machining on the outer peripheral surface of the sheath layer.

13. The method for manufacturing multi-conductor cable for the vehicle as claimed in claim 11, wherein the forming forms the marking portion so that an average surface of the marking portion is substantially lower with respect to an average surface of the peripheral region.

14. The method for manufacturing multi-conductor cable for the vehicle as claimed in claim 11, wherein the insulating layer includes a polyethylene-based resin as a main component thereof.

15. The method for manufacturing the multi-conductor cable for the vehicle as claimed in claim 14, wherein the polyethylene-based resin is crosslinked in the insulating layer.

* * * * *